United States Patent
Ayle

(10) Patent No.: US 7,510,052 B2
(45) Date of Patent: Mar. 31, 2009

(54) ACOUSTIC SEPTUM CAP HONEYCOMB

(75) Inventor: Earl Ayle, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 84 days.

(21) Appl. No.: 11/726,451

(22) Filed: Mar. 22, 2007

(65) Prior Publication Data
US 2008/0020176 A1 Jan. 24, 2008

Related U.S. Application Data

(63) Continuation-in-part of application No. 11/099,337, filed on Apr. 4, 2005.

(51) Int. Cl.
*G10K 11/172* (2006.01)
(52) U.S. Cl. .................. 181/292; 181/213; 181/286; 181/288; 181/290; 181/291; 181/293
(58) Field of Classification Search .............. 181/284, 181/286, 288, 290, 291, 292, 293, 213
See application file for complete search history.

(56) References Cited

U.S. PATENT DOCUMENTS

| | | | | |
|---|---|---|---|---|
| 4,989,422 A | * | 2/1991 | Barlow et al. | 66/170 |
| 5,785,919 A | * | 7/1998 | Wilson | 264/401 |
| 5,830,548 A | * | 11/1998 | Andersen et al. | 428/36.4 |
| 6,114,652 A | * | 9/2000 | Clarke et al. | 219/121.71 |
| 6,371,242 B1 | * | 4/2002 | Wilson et al. | 181/292 |
| 6,609,592 B2 | * | 8/2003 | Wilson | 181/292 |

FOREIGN PATENT DOCUMENTS

GB 2252076 A * 7/1992

* cited by examiner

*Primary Examiner*—Walter Benson
*Assistant Examiner*—Jeremy Luks
(74) *Attorney, Agent, or Firm*—W. Mark Bielawski; David J. Oldenkamp

(57) ABSTRACT

An acoustic structure that includes a honeycomb having cells in which septum caps are located. The septum caps are formed from sheets of acoustic material and include a resonator portion and a flange portion. The flange portion has an anchoring surface that provides frictional engagement of the septum caps to the honeycomb cells when the caps are inserted into the honeycomb during fabrication of the acoustic structure. An adhesive is applied to the anchoring surface of the septum caps after the caps have been inserted into the honeycomb cells to provide a permanent bond.

20 Claims, 6 Drawing Sheets

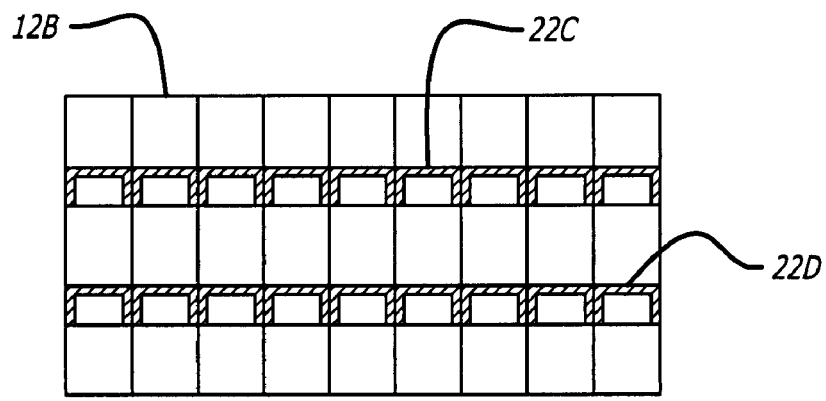
FIG. 5
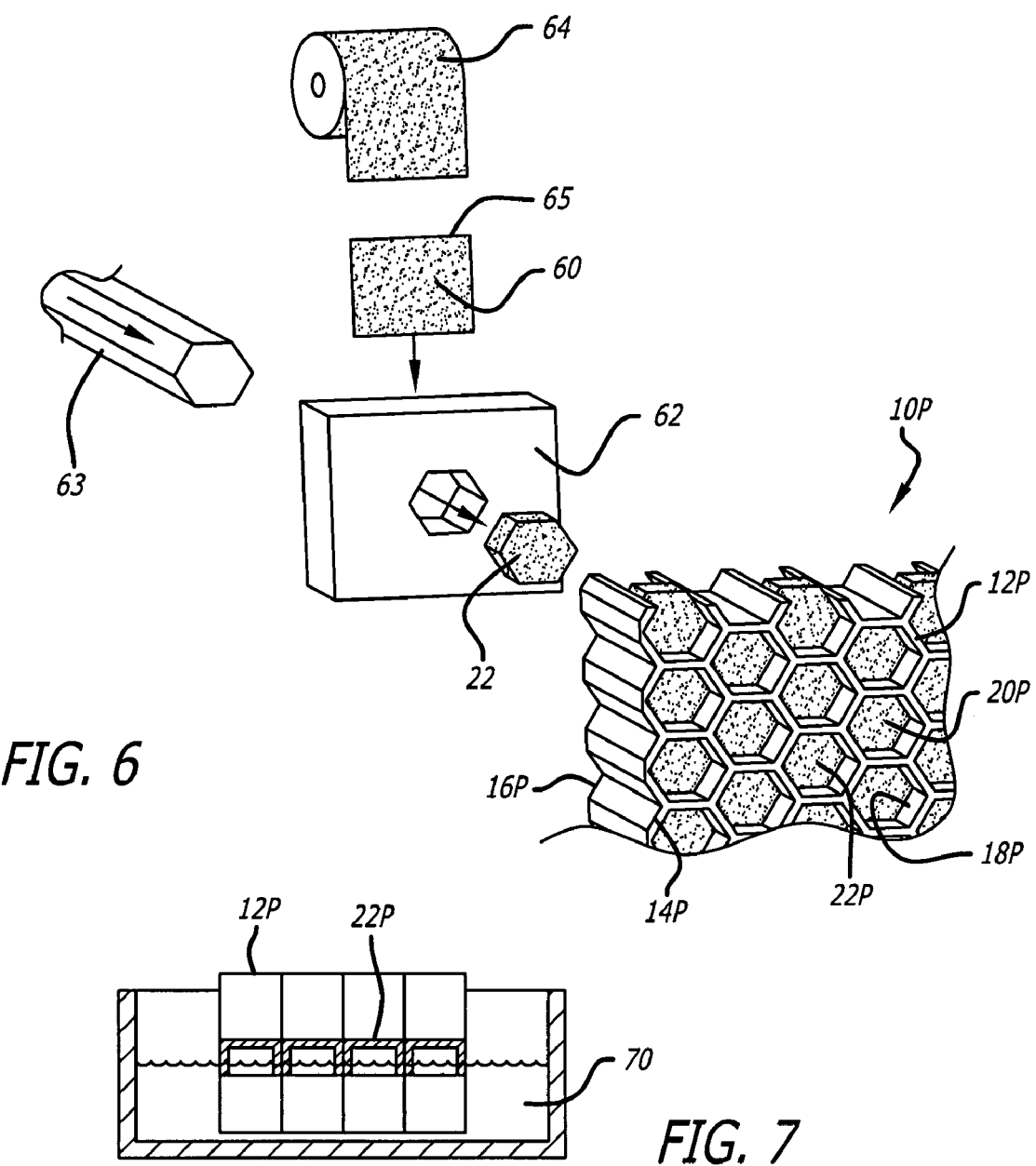
FIG. 6
FIG. 7

FIG. 10
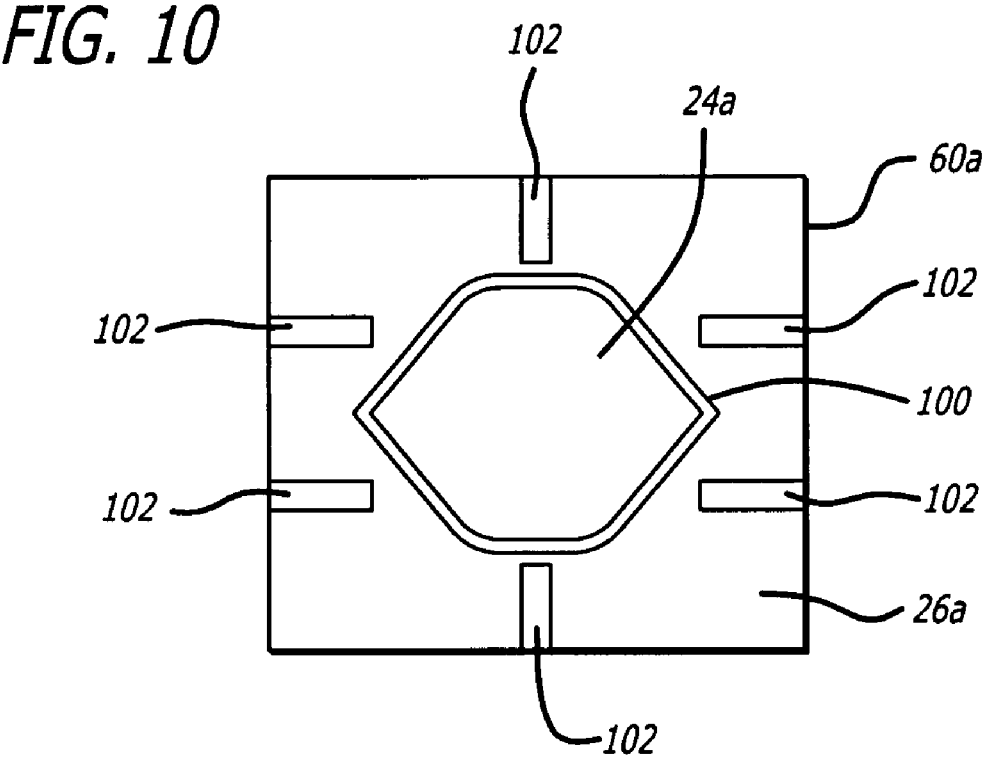
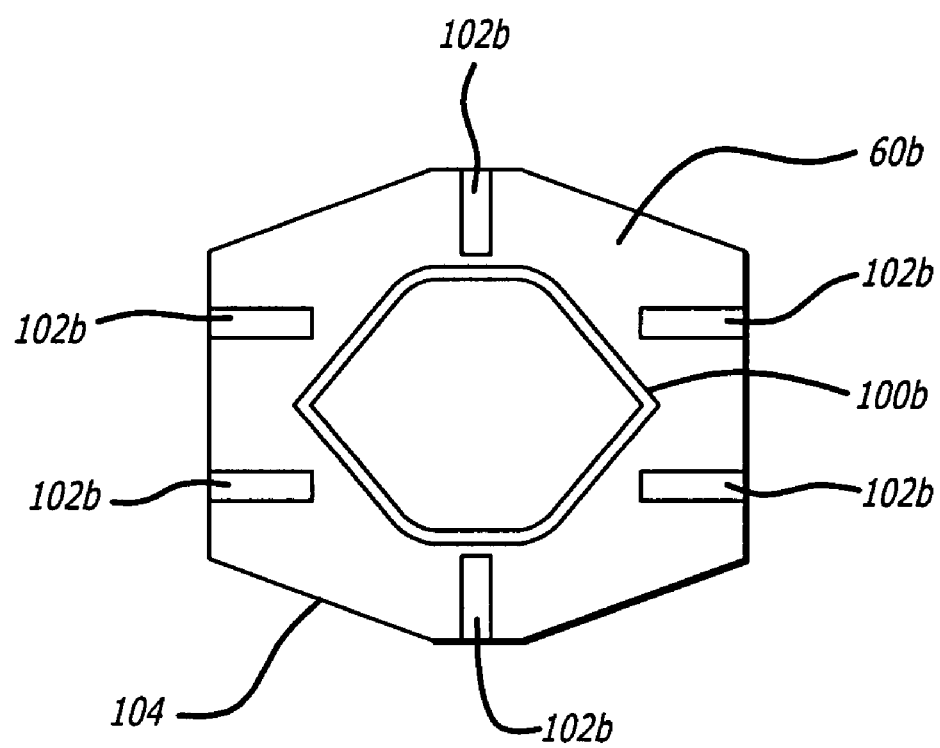
FIG. 11

ACOUSTIC SEPTUM CAP HONEYCOMB

This application is a continuation-in-part of co-pending application Ser. No. 11/099,337, filed on Apr. 4, 2005.

BACKGROUND OF THE INVENTION

1. Field of the Invention

The present invention relates generally to acoustic systems that are used to attenuate noise. More particularly, the present invention involves using honeycomb to make nacelles and other structures that are useful in reducing the noise generated by a jet engine or other noise source.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine. The basic problem that faces engineers is how to add these thin and flexible acoustic materials into the structural elements of the jet engine and surrounding nacelle to provide desired noise attenuation.

Honeycomb has been a popular material for use in aircraft and aerospace vehicles because it is relatively strong and lightweight. For acoustic applications, the goal has been to somehow incorporate the thin acoustic materials into the honeycomb structure so that the honeycomb cells are closed or covered. The closing of the cells with acoustic material creates the acoustic impedance upon which the resonator is based.

One approach to incorporating thin acoustic materials into honeycomb is referred to as the sandwich design. In this approach, the thin acoustic sheet is placed between two slices of honeycomb and bonded in place to form a single structure. This approach has advantages in that one can utilize sophisticated acoustic material designs that are woven, punched or etched to exact dimensions and the bonding process is relatively simple. However, a drawback of this design is that the strength of the structure is limited by the bond between the two honeycomb slices and the acoustic material. Also, the bonding surface between the two honeycomb slices is limited to the surface area along the edges of the honeycomb. In addition, there is a chance that some of the holes in the acoustic material may be closed with excess adhesive during the bonding process. It is important that the holes not be closed because this can result in loss of active acoustical area of the resonator.

A second approach uses relatively thick solid inserts that are individually bonded in place within the honeycomb cells. Once in place, the inserts are drilled or otherwise treated to form the holes that are necessary for the inserts to function as an acoustic material. This approach eliminates the need to bond two honeycomb slices together. The result is a strong structure in which the inserts are securely bonded. However, this approach also has a few drawbacks. For example, the cost and complexity of having to drill millions of holes in the solid inserts is a major drawback. In addition, the relatively thick solid inserts make the honeycomb stiff and difficult to form into non-planar structures, such as nacelles for jet engines.

SUMMARY OF THE INVENTION

In accordance with the present invention, honeycomb acoustic structures are provided in which individual sheets of acoustic material are formed into septum caps that are inserted into the honeycomb cells. The septum caps have a flange portion that is substantially thicker than the acoustic material and provide an anchoring surface that is used to attach the septum cap to the walls of the honeycomb. The septum caps are initially held in place within the cells by frictional locking between the anchoring surface and the cell walls. This frictional locking is sufficient to keep the septum caps in position until they are permanently bonded in place with an adhesive.

The acoustic structures of the present invention are designed to be located near a source of noise, such as a jet engine or other power plant. The structures include a honeycomb that has a first edge which is to be located nearest the source of noise and a second edge located away from the source. The honeycomb includes a plurality of walls that extend between the first and second edge of the honeycomb. The walls of the honeycomb define a plurality of cells wherein each of the cells has a cross-sectional area measured perpendicular to honeycomb walls and a depth defined by the distance between the first and second edges.

As a feature of the present invention, a septum cap is located within at least one of the honeycomb cells and covers the entire cross-sectional area of the cell. The septum cap is made from a sheet of acoustic material that has a thickness and a perimeter. The sheet is preferably rectangular in shape. The septum cap includes a resonator portion that has an outer edge located adjacent to the honeycomb walls and a flange portion that extends between the outer edge of the resonator portion and the perimeter of the sheet of acoustic material. The flange portion has an anchoring surface that is initially attached to the cell walls via a frictional engagement to form a precursor structure. The anchoring surface has a width wherein the width of the anchoring surface is substantially greater than the thickness of the sheet of acoustic material so that it provides the required degree of frictional locking between the septum caps and the honeycomb walls. The final acoustic structure is made by taking the precursor structure and applying an adhesive to the anchoring surface and the cell wall to permanently bond the septum in place.

The present invention provides a number of advantages over existing honeycomb acoustic structures. For example, there is no seam between two honeycomb slices to weaken the structure. The septum caps may be placed at different levels within the honeycomb cells to provide fine-tuning of noise attenuation based on well-known Helmholtz resonator theory. Multiple septum caps may be placed in a single honeycomb cell at different levels to create multiple cavities and impedance grids. Septum caps made from different acoustic materials may be used in the same honeycomb structure or even within the same honeycomb cell. The flange portion provides a relatively large anchoring surface area to insure secure bonding of the septum cap to the cell wall over the lifetime of the structure. In addition, the relatively thin and flexible septum caps do not reduce the flexibility of the honeycomb, which is an important consideration for nacelles and other non-planar acoustic structure.

The above discussed and many other featured and attendant advantages of the present invention will become better

BRIEF DESCRIPTION OF THE DRAWINGS

FIG. 5 is a cross sectional view of an exemplary acoustic structure in accordance with the present invention where two septum caps are located within each honeycomb cell.

FIG. 6 is a schematic representation of a portion of the fabrication process for making acoustic structures where the septum cap is formed from a sheet of acoustic material and inserted into the honeycomb to form a precursor structure.

FIG. 7 is a sectional view showing an exemplary preferred method for applying adhesive to the anchoring surface of the septum cap and honeycomb wall by dipping the precursor structure into a pool of adhesive such that the flange of the septum cap, but not the resonator portion, comes in contact with the adhesive.

FIG. 10 is top view of a preferred exemplary septum that has been embossed to control folding and adhesive flow.

FIG. 11 is a top view of a preferred exemplary septum that has been embossed in the same manner as the septum in FIG. 10 and further cut to enhance insertion of the septum into the honeycomb.

DETAILED DESCRIPTION OF THE INVENTION

Figure 1:
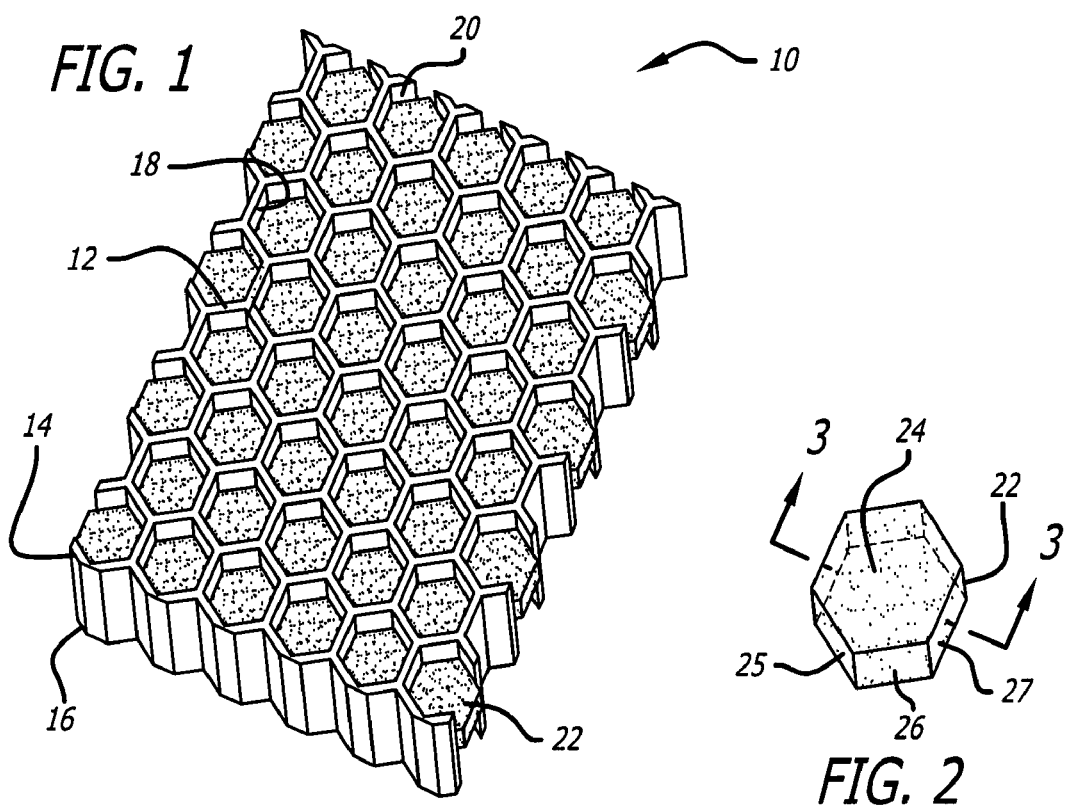
FIG. 1 is a perspective view of an exemplary acoustic structure in accordance with the present invention.

An exemplary acoustic structure in accordance with the present invention is shown generally at 10 in FIGS. 1 and 6. The acoustic structure 10 includes a honeycomb 12 having a first edge 14 which is to be located nearest the noise source and a second edge 16. The honeycomb 10 includes walls 18 that extend between the two edges 14 and 16 to define a plurality of cells 20. Each of the cells 20 has a depth (also referred to as the core thickness) that is equal to the distance between the two edges 14 and 16. Each cell 20 also has a cross-sectional area that is measured perpendicular to the cell walls 18. The honeycomb can be made from any of the conventional materials used in making honeycomb panels including metals, ceramics, and composite materials.

As a feature of the present invention, septum caps 22 are located within the cells 20. It is preferred, but not necessary, that the septum caps 22 be located in most, if not all, of the cells 20. In certain situations, it may be desirable to insert the septum caps 22 in only some of the cells to produce a desired acoustic effect. Alternatively, it may be desirable to insert two or more septum caps into a single cell.

Figure 2:
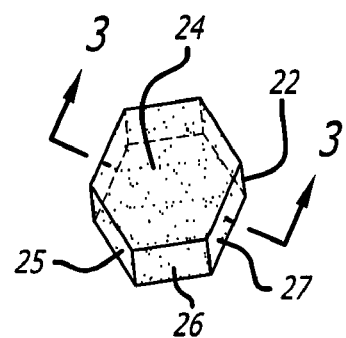
FIG. 2 is a perspective view of an exemplary septum cap in accordance with the present invention.
Figure 3:
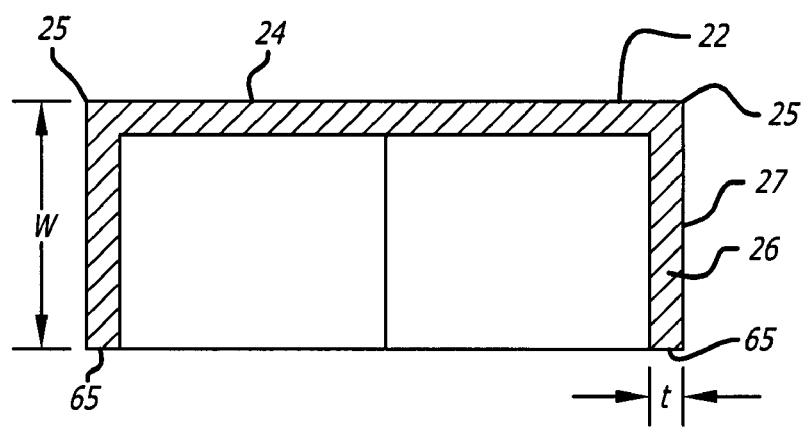
FIG. 3 is a cross sectional view of the exemplary septum cap shown in FIG. 2 taken in the 3-3 plane.

An exemplary septum cap 22 is shown in FIGS. 2 and 3. The septum cap 22 is formed from a sheet of acoustic material by folding the sheet into a hexagonal shaped cap that is sized to match the cross-sectional areas of the honeycomb cells. The septum cap 22 is preferably formed as shown in FIG. 6 by forcing the sheet 60 of acoustic material through a cap folding die 62 using plunger 63. The sheet 60 is preferably slightly rectangular in shape and cut from a roll of acoustic material 64. The sheet 60 has a thickness (t) as shown in FIG. 3 and a perimeter 65. The size and shape of the sheet 60 may be varied widely depending upon the shape/size of the honeycomb cell into which the sheet is inserted, the thickness of the sheet 60 and the particular acoustic material being used.

Referring to FIGS. 2 and 3, the septum cap 22 includes a resonator portion 24 that has outer edge 25. The septum cap 22 further includes a flange portion 26 that has an anchoring surface 27 which is initially attached to the cell walls 18 by friction engagement followed by permanent bonding using an appropriate adhesive. The anchoring surface 27 has a width (W).

The width (W) of the anchoring surface may be varied depending upon a number of factors including the cross-sectional area of the cells, the thickness of the acoustic material, the type of acoustic material and the adhesive. For a typical honeycomb having ¼ to 1 inch cells, anchoring surface widths on the order of 0.05 inch to 0.500 inch are suitable for acoustic material that has a thickness on the order of 0.001 inch to 0.10 inch. For standard acoustic materials having a thickness of from 0.004 to 0.006 inch, anchoring surface widths of at least 0.20 inch are preferred. In general, it is preferred that the width of the anchoring surface be substantially greater than the thickness of the acoustic material. "Substantially greater" means that the width of the anchoring surface is at least 5 times greater than the thickness of the acoustic material and preferably at least 20 times greater.

Any of the standard acoustic materials may be used to form the septum caps. These acoustic materials are typically provided as relatively thin sheets that are perforated, porous or an open mesh fabric that is designed to provide noise attenuation. Although perforated and porous sheets of various materials (metals, ceramics, plastics) may be used, it is preferred that the acoustic material be an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethyloene (PTFE), polyphenylene sulfide (PPS), polyfluoroethylene propylene (FEP), polyether ether ketone (PEEK), polyamide 6 (Nylon, 6 PA6) and polyamide 12 (Nylon 12, PA12); are just a few examples. Open mesh fabric made from PEEK is preferred for high temperature applications. Open mesh acoustic fabrics and other acoustic materials that may be used to form the septum caps in accordance with the present invention are available from a wide variety of commercial sources. For example, sheets of open mesh acoustic fabric may be obtained from SEFAR America Inc. (Buffalo Division Headquarters 111 Calumet Street Depew, N.Y. 14043) under the trade names SEFAR PETEX, SEFAR NITEX and SEFAR PEEKTEX.

Figure 4:
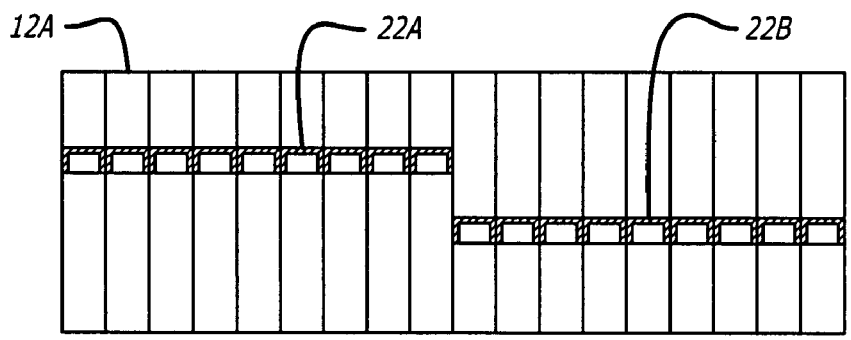
FIG. 4 is a cross sectional view of an exemplary acoustic structure in accordance with the present invention where two sets of septum caps are located at two different depths within the honeycomb cells.

The septum caps 22 may be inserted into the honeycomb cell to provide a wide variety of acoustic designs. For example, the septum caps may be located at different levels within the honeycomb 12a as shown at 22a and 22b in FIG. 4. This type of design allows fine-tuning of the noise attenuation properties of the acoustic structure. The two-level design shown in FIG. 4 is intended only as an example of the wide variety of possible multi-level septum arrangements that are possible in accordance with the present invention. As will be appreciated by those skilled in the art, the number of different possible septum placement levels is extremely large and can be tailored to meet specific noise attenuation requirements.

Another example of an insertion configuration for the septum caps 22 is shown in FIG. 5. In this configuration, two sets of septum caps 22c and 22d are inserted into the honeycomb 12b to provide each cell with two septum caps. As is apparent, numerous possible additional configurations are possible where three or more septum caps are inserted into a given cell. In addition, the multi-level insertion design exemplified in FIG. 4 may be combined with the multiple insertion per cell design exemplified in FIG. 5 to provide an unlimited number of possible septum cap insertion configurations that can be used to fine tune the acoustic structure to provide optimum noise attenuation for a given source of noise.

As previously mentioned, the preferred method for inserting the septum caps into the honeycomb is shown in FIG. 6 where the septum cap is pre-formed using cap folding die 62 and plunger 63. The reference numerals used to identify the honeycomb structure in FIG. 6 are the same as in FIG. 1, except that they include a "p" to indicate that the structure is a precursor structure wherein the septum caps are not yet permanently bonded to the cell walls.

It should be noted that the use of a cap-folding die 62 to form the septum cap from the individual sheets of acoustic material is preferred, but not required. It is possible to use the honeycomb as the die and form the septum cap by simply forcing the sheet 60 into the cells using plunger 63. However, the edges of many honeycomb panels tend to be relatively jagged because the panels are typically cut from a larger block of honeycomb during the fabrication process. Accordingly, the honeycomb edges tend to catch, tear and contaminate the acoustic material when a flat sheet of material is forcibly inserted directly into the cell. Accordingly, if desired, the cap-folding die may be eliminated, but only if the edges of the honeycomb are treated to remove any rough or jagged edges.

It is important that the size/shape of the sheet of acoustic material and the size/shape of the die/plunger (or just the plunger if the die is not used) be chosen such that the septum cap can be inserted into the cell without damaging the acoustic material while at the same time providing enough frictional contact between the anchoring surface and the cell wall to hold the septum cap in place during subsequent handling of the precursor structure. Routine experimentation can be used to determine the various sizes and shapes of acoustic sheets that are required in order to achieve the necessary frictional locking or holding of the septum caps in place in the precursor structure prior to permanent bonding of the anchoring surface to the cell wall with adhesive. The amount of frictional locking or holding should be sufficient to keep the septum caps from falling out of the honeycomb, even if the precursor structure is inadvertently dropped during handling.

For a standard ⅜ inch composite honeycomb made from conventional fiberglass/phenolic materials, the preferred size for a sheet of typical open mesh acoustic material (0.004 to 0.006 inch thick) is a rectangle having dimensions ranging from 0.50 to 0.70 inch by 0.60 to 0.80 inch. It is preferred that the sheet of acoustic material is not notched or otherwise cut in an effort to enhance folding of the sheet. It was found that the sheets, without notching, folded into septum caps that had wrinkles in the anchoring surfaces that enhanced the bonding of the septum caps to the honeycomb walls. In addition, notching tends to release some of the outward tension or bias force that would otherwise be present in the flange portion of the septum cap. This outward tension or force is a result of the folded sheet being inherently biased back towards an unfolded position. This outward bias or force is an important part of the frictional locking between the septum cap and the cell wall.

A precursor structure is shown at 10p in FIG. 6 where the septum caps 22 are held in place only by frictional locking. As mentioned previously, the frictional locking must be sufficient to hold the septum caps securely in position until they can be permanently bonded using an appropriate adhesive. The adhesive that is used can be any of the conventional adhesives that are used in honeycomb panel fabrication. Preferred adhesives include those that are stable at high temperature (300-400° F.). Exemplary adhesives include epoxies, acrylics, phenolics, cyanoacrylates, BMI's, polyamide-imides, and polyimides.

The adhesive may be applied to the anchoring surface/cell wall interface using a variety of known adhesive application procedures. An important consideration is that the adhesive should be applied selectively only to the flange anchoring surface/cell wall interface and not to the resonator portion of the septum cap. Application of the adhesive to the resonator portion will result in closing or at least reducing the size of the openings in the mesh or other acoustic material. Any adhesive application procedure that can provide selective application of adhesive to the anchoring surface/cell wall interface may be used.

An exemplary adhesive application procedure is shown in FIG. 7. In this exemplary procedure, the honeycomb 12p is simply dipped into a pool 70 of adhesive so that only the flange portions of the septum caps 22p are immersed in the adhesive. It was found that the adhesive could be accurately applied to the anchoring surface/cell wall interface using this dipping procedure provided that the septum caps were accurately placed at the same level prior to dipping. For septum caps located at different levels, multiple dipping steps are required. Alternatively, the adhesive could be applied using a brush or other site-specific application technique. Some of these techniques may be used to coat the core walls with the adhesive before the septum cap is inserted. Alternatively, the adhesive may be screen printed onto the septum material and staged before insertion into the core The dipping procedure for applying the adhesive as depicted in FIG. 7 was found to work particularly well because the wrinkles present in the folded sheets of acoustic material provide small channels between the anchoring surface and cell wall that allows adhesive to be more easily wicked upward by capillary action. This upward wicking provides for fillet formation at the intersection of the outer edge of the resonator portion and the cell wall. The formation of adhesive fillets at the edge of the resonator portion not only provides for good bonding to the cell wall, but also provides a well-defined boundary between the adhesive and the resonator portion to insure that the acoustic properties of the resonator portion are not adversely affected by the adhesive.

The formation of fillets at the intersection of the cell wall and resonator portion does not always prevent continued wicking of the adhesive past the outer edge of the resonator portion. This uncontrolled wicking of adhesive into the resonator portion may lead to variable resonator performance. Accordingly, it is preferred that an adhesive flow barrier be placed along the outer edge of the resonator portion to prevent or at least delay wicking of adhesive into the resonator portion. A sheet of material 60a that forms septum cap precursor is shown in FIG. 10. The sheet of material 60a includes an adhesive flow barrier 100. The adhesive flow barrier 100 may be made in a number of different ways provided that the barrier is capable of stopping or at least delaying the flow of adhesive from the flange portion 26a of the septum cap into the resonator portion 24a. The barrier should be able to delay the flow of adhesive for at least a few minutes, as a minimum, with longer delay times being preferred.

The adhesive flow barrier 100 may be made using any material that is compatible with the acoustic sheet material and which repels the adhesive being used to adhere the septum cap to the cell wall. Such materials include XK-22 release agent, which is available from Releasomers Inc. (Bradfordwood, Pa.) and FREKOTE 00044, which is available from Dexter Corp. (Seabrook, N.H.). Alternatively, a line of adhesive may be screen-printed or otherwise applied and dried to form the barrier 100. In addition, the barrier 100 can be formed by thermally melting the acoustic sheet material provided that the integrity and strength of the sheet material is not adversely affected. When adhesive-repellant materials are used, the barrier 100 may be in the form of a continuous line, as shown in FIG. 10, or the entire resonator portion 24a may be coated provided that the resonator properties of the material are not unduly compromised.

In a preferred embodiment, the adhesive flow barrier 100 is made by embossing (i.e flattening) the acoustic sheet material. This embossing of the acoustic sheet material flattens the fibers to form the barrier 100 in which the gaps between the fibers are reduced. This flattening of the fibers effectively stops the flow of adhesive for a sufficient time to allow the adhesive to dry without crossing the barrier. Any number of different mechanical apparatus may be used to form an embossed adhesive flow barrier 100 in the sheet material. The term "embossed" means that the woven fibers (or other type of mesh material) are creased or otherwise deformed to flatten the fibers or mesh material so that gaps in the material are reduced to form the flow barrier 100.

Figure 12:
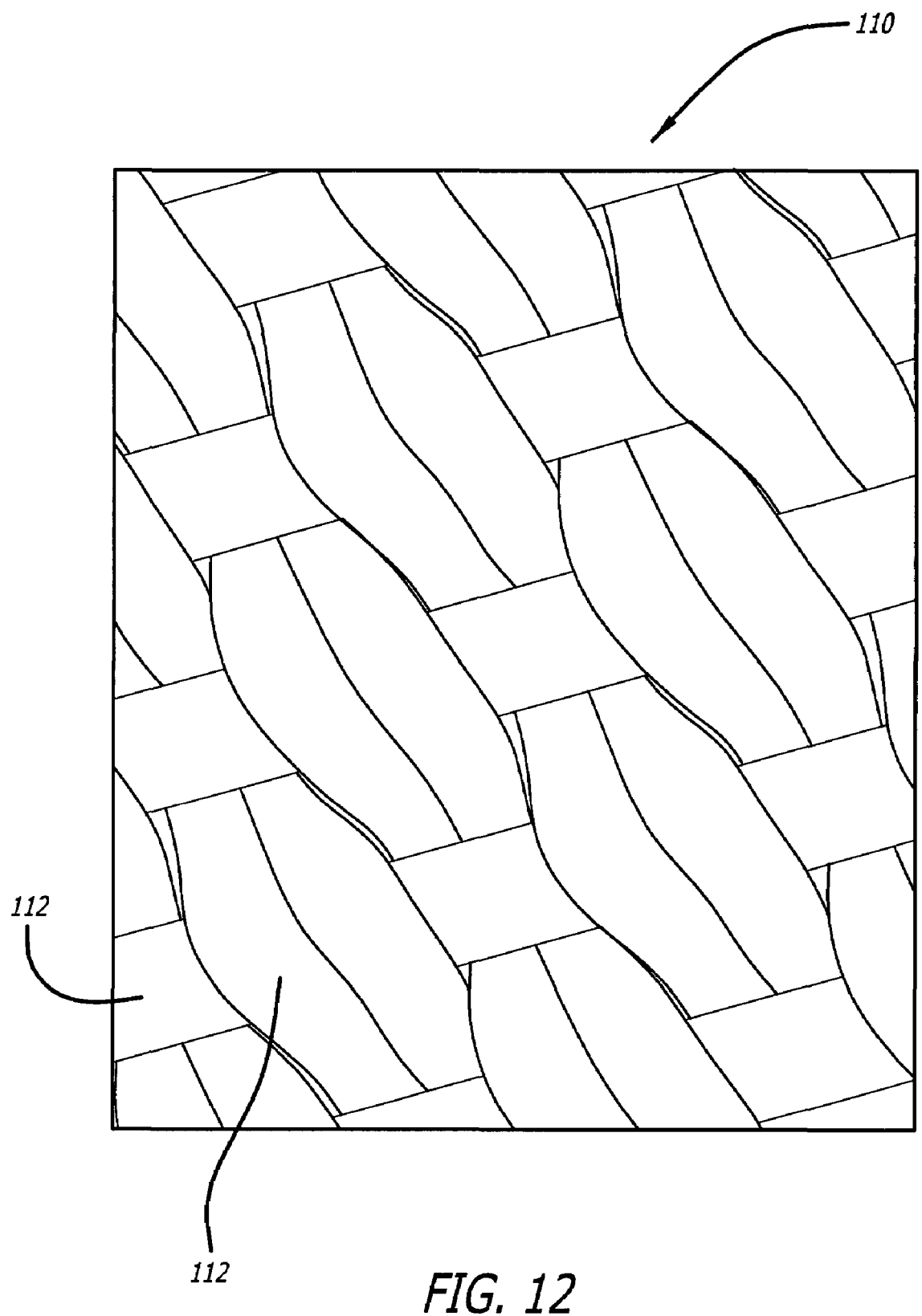
FIG. 12 is a magnified view of the mesh material prior to embossing.
Figure 13:
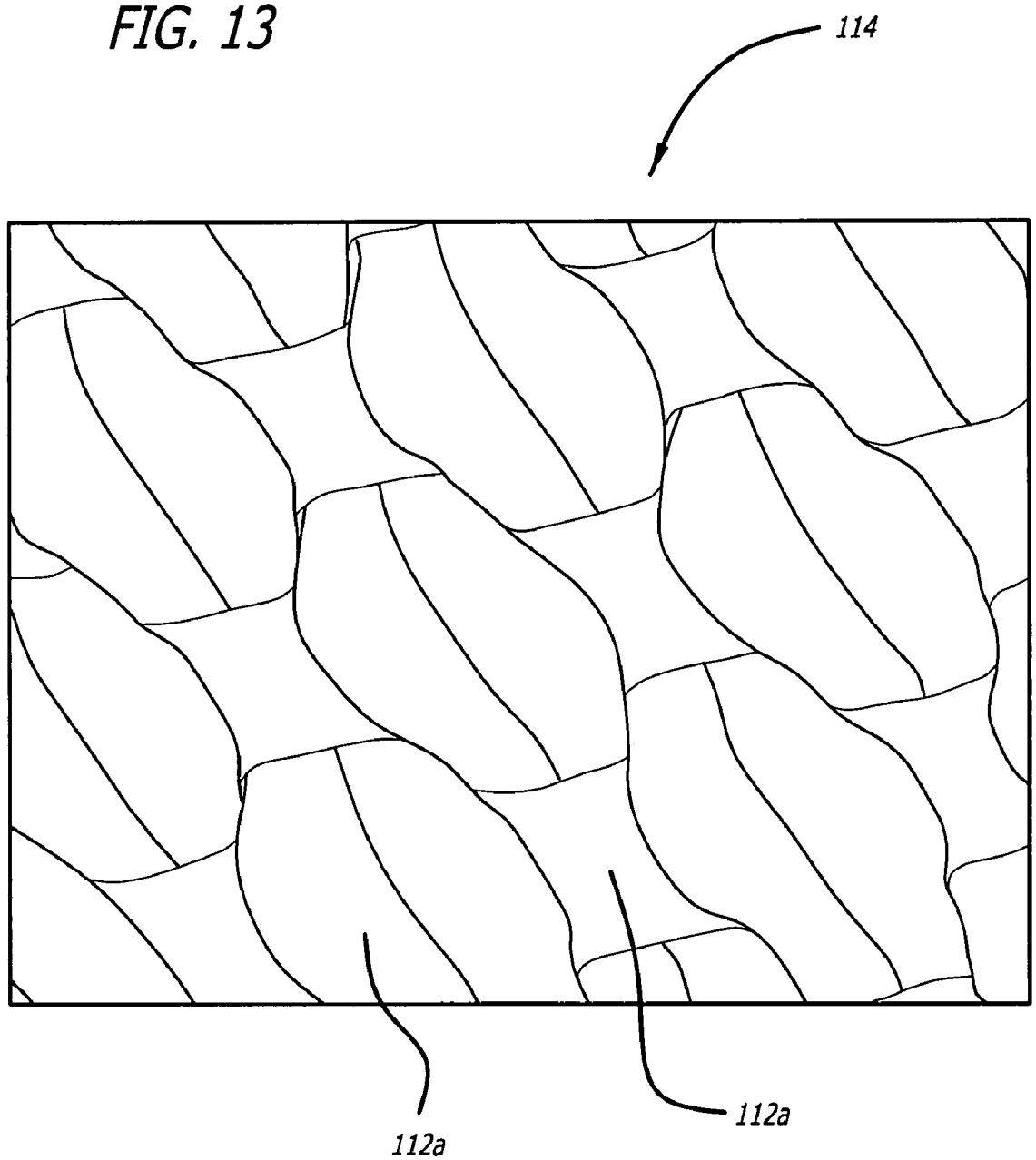
FIG. 13 is a magnified view of the same mesh material after it has been embossed to form an adhesive flow barrier.

It is preferred that a punch and die be used to emboss the sheet of acoustic material to form the adhesive flow barrier 100. Although other types of acoustic mesh materials may be embossed, it is preferred that the acoustic material be an open mesh fabric made from woven fibers, which are preferably monofilament polymer fibers. Acoustic materials made with PEEK fibers are preferred because the fibers are easily deformed. A section of exemplary open mesh fabric is shown diagrammatically at 110 in FIG. 12. The fabric 110 is composed of monofilament polymer fibers 112. During the embossing process, the fibers are deformed (i.e. flattened) as shown in FIG. 13 to form an embossed section 114 that has flattened fibers 112a. The flattening of the fibers is preferably permanent. However, it is only important that the fibers remain deformed for a sufficient time to provide a barrier to adhesive flow during the time required for fabrication of the acoustic structure.

The physical dimensions and characteristics of the adhesive flow barrier may be varied depending upon the particular type of barrier being used. It is only important that the barrier be made sufficiently impermeable so as to prevent adhesive from flowing past it during the application of adhesive to the septum cap and during subsequent drying of the adhesive within the acoustic structure. For barriers formed by embossing woven fabric, the adhesive flow barrier should be from 0.005 to 0.050 inch wide. Barrier widths on the order of about 0.020 inch are preferred. The fibers should be deformed so that their original diameters have been flattened by between about 20 to 60 percent. The adhesive flow barrier will typically be in the form of a hexagon as shown in FIG. 10. However, this shape may be changed depending upon the particular shape of the cell into which the septum cap is to be inserted.

The embossed depression that forms adhesive flow barriers in the acoustic material may have a variety of cross-sectional shapes. The shapes may range from relatively square or rectangular depressions to round or oval depressions. The punch and die used to deform the sheet material to form the adhesive flow barrier should be shaped to provide depressions that do not have any sharp corners where the fibers might be cut or otherwise adversely affected.

It is also preferred that the acoustic sheet material be embossed or creased in order to help control the folding of the sheet material when it is formed into the septum cap. Referring to FIG. 10, the sheet of material 60a includes folding aids 102. The folding aids are preferably located around the perimeter of the sheet 60a to better control initial folding of the sheet as it shaped into the septum cap. The number and orientation of folding aids 102 may be varied depending upon a number of factors including the particular sheet material being used and the shape of the cells into which the septum cap is being inserted. The orientation and location of the folding aids 102, as shown in FIG. 10, are preferred for septum caps that are to be inserted into hexagonal honeycomb structure.

The folding aids 102 may be made by using any process that produces locations in the sheet of material that are more likely to fold than other locations. It is preferred that the folding aids 102 are made using the same embossing process that is used to form the adhesive flow barrier 100. Even more preferred is that the folding aids and adhesive flow barrier be formed at the same time using a single punch and die combination. The use of embossing to form both the adhesive flow barrier and folding aids provides the advantage of achieving a solution to two different unrelated fabrication issues using a single simple step.

The physical dimensions of embossed folding aids will vary depending upon the particular sheet material. It is only necessary that the embossed area or crease cause folding of the material to begin at the desired location during formation of the septum cap. The width of the embossed line should be from 0.015 to 0.050 inch with embossed line widths of about 0.040 inch being preferred. It is preferred that the degree of embossing (i.e. flattening) of the material be from 20 to 60 percent of the original diameter of the fiber.

The embossed depressions that form the folding aids in the acoustic material may have a variety of cross-sectional shapes. The shapes may range from relatively square or rectangular depressions to round or oval depressions. The punch and die used to deform the sheet material to form the folding aids should be shaped to provide depressions that do not have any sharp corners where the fibers might be cut or otherwise adversely affected.

An alternate embodiment of a sheet of material that forms a septum cap precursor is shown at 60b in FIG. 11. The sheet of material 60b is embossed in the same manner as 60a shown in FIG. 10 to provide an adhesive flow barrier 100b and folding aids 102b. In addition, the corners of the sheet of material have been trimmed to provide a perimeter 104 that is in the shape of an octagon having sides of unequal length. Suitable septum cap precursors may be made using any number of perimeter shapes and folding aid combinations. However, the combination of an octagonal perimeter with six folding aids, as shown in FIG. 11, is preferred The acoustic structures in accordance with the present invention may be used in a wide variety of situations where noise attenuation is required. The structures are well suited for use in connection with power plant systems where noise attenuation is usually an issue. Honeycomb is a relatively lightweight material. Accordingly, the acoustic structures of the present invention are particularly well suited for use in aircraft systems. Exemplary uses include nacelles for jet engines, cowlings for large turbine or reciprocating engines and related acoustic structures.

Figure 8:
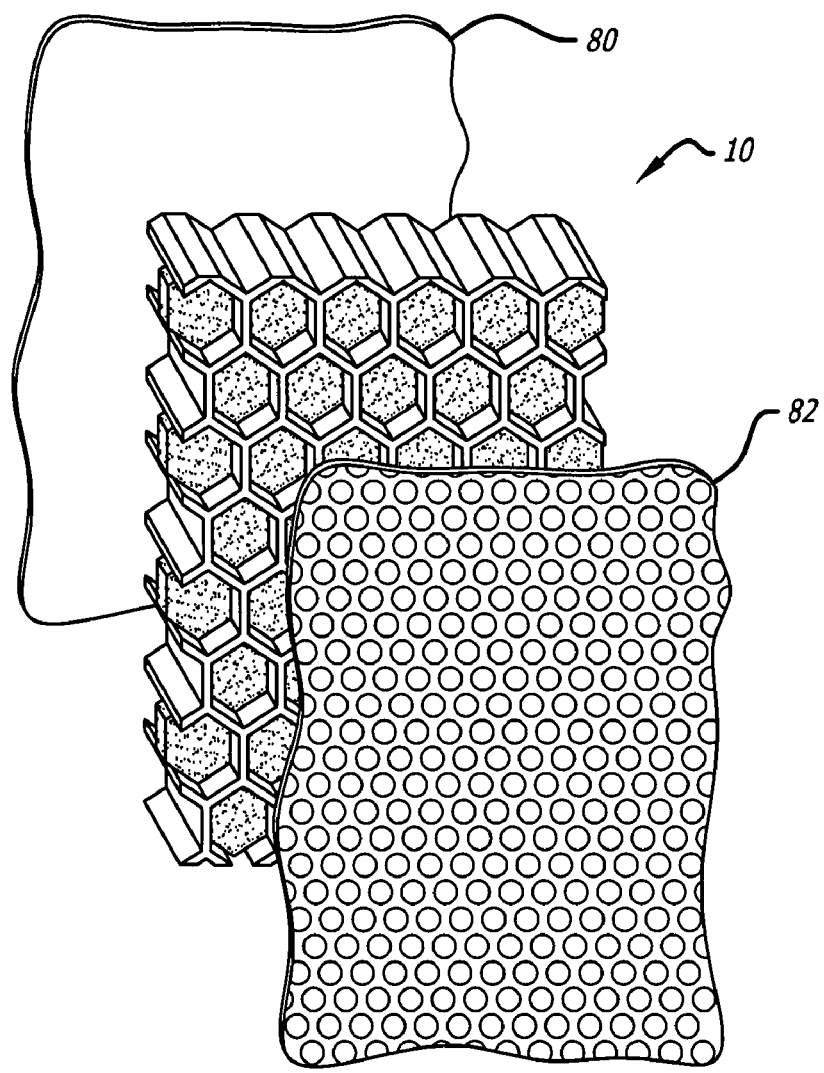
FIG. 8 is an exploded perspective view showing a portion of a solid skin, acoustic structure and perforated skin that are combined together to form an acoustic structure of the type shown in FIG. 9.
Figure 9:
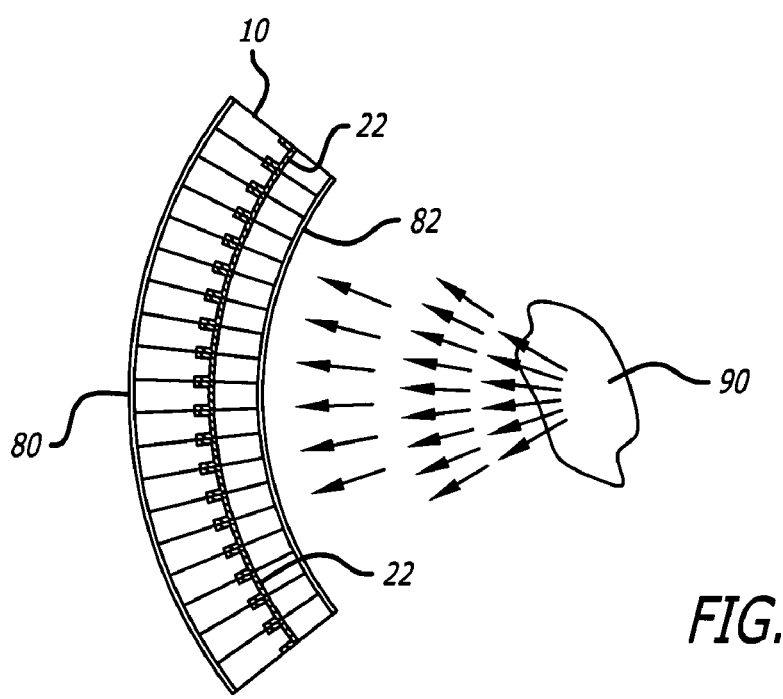
FIG. 9 is a partial sectional view of an exemplary acoustic structure (nacelle) that is located near a noise source (jet engine). The acoustic structure includes an acoustic honeycomb sandwiched between a solid skin and a perforated skin.

The basic acoustic structure of the present invention is typically heat-formed into the final shape of the engine nacelle and then the skins or sheets of outer material are bonded to the outside edges of the formed acoustic structure with an adhesive layer(s). This completed sandwich is cured in a holding tool, which maintains the complex shape of the nacelle during the bonding. For example, as shown in FIG. 8, the acoustic structure 10 is heat-formed into the final nacelle shape. The sandwich part is made by placing the solid sheet or skin 80 into the bonding tool. Next, a layer of adhesive is placed on the skin. This is followed by the addition of the shaped acoustic structure 10. The second layer of adhesive film is added and then the top skin 82. This completes the sandwich. The assembly is bonded with heat and pressure. The final nacelle shape is controlled by the bond tool. The panel will then conform around the jet engine, which is shown diagrammatically at 90 in FIG. 9.

Examples of Practice are as Follows:

The following example provides details regarding an exemplary acoustic septum cap honeycomb in accordance with the present invention. It will be recognized by those skilled in the art that a wide variety of dimensions, honeycomb material, acoustic mesh material and adhesives may be used. In general, the particular structural and acoustic application will determine the various design requirements, which include core density, septum depth, acoustic impedance, core thickness, slice length, slice width and mesh material dimensions.

Exemplary Septum Core Product:

An exemplary acoustic septum cap core was made from fiberglass honeycomb with ⅜-inch cells. The septums were located 0.500 inch from the edge of the core, which was 1.25 inch thick. The acoustic impedance of the septum core was found to be 70 cgs rayls.

Materials:

Honeycomb was supplied by Hexcel Corporation (Dublin, Calif.) and identified as Part number-HRP-⅜-4.5 pounds per cubic foot (pcf) (0/90 degree fiberglass architecture with phenolic resin) The density of the honeycomb was 4.5 pounds per cubic foot. Acoustic Mesh was obtained from SEFAR America, Inc. which was identified as Part number-17-2005-W022 (Nonmetallic woven mesh with an acoustic impedance range from 45 to 64 cgs rayls).

The adhesive was obtained from Hexcel Corporation and identified as Part number-899-55. The adhesive is in the Polyamide-imide family, which is a proprietary material. Other adhesives, such as epoxies, acrylics, phenolics, cyanoacrylates and polyamides, may be used, if desired.

The Acoustic Core Dimensions were as Follows:

Core cell size: Typical cell size was 0.396 inch hexagonal inside dimensions measured from wall to wall. Slice thickness was typically 1.250 inch. The mesh inserted into the hexagonal cells was typically 0.700 inch by 0.650 inch rectangular shape. The mesh was folded to form the cap and inserted into honeycomb cell. The top of the cap conforms to the cell shape and size (hexagonal shape with inside dimensions of 0.396 inches). The side of the cap conforms to the honeycomb cell wall for adhesive attachment. The sides of the cap are typically 0.1875 inch long and are dipped into the adhesive for attachment of the septum cap to the honeycomb.

Adhesive Dipping and Curing Process:

The honeycomb core with the septum caps inserted into each cell is dipped as follows:

a. The core is placed into a tank of adhesive with the top of the septum in the up position.

b. The slice is lowered to a set level, which allows the adhesive to move up the honeycomb slice thickness and cover the bottom sides of the cap.

c. The adhesive dip level up the side of the cap is typically 0.150 inch. The adhesive will wick up the last typical 0.0375 inch to close and lock the mesh fibers and bond the cap to the honeycomb wall.

The Adhesive Cure Cycle is Accomplished as Follows:

Immediately after dipping and draining, the core is placed into a 300° F. oven. The adhesive is subjected to a cure cycle of 300° F. for 30 minutes, 350° F. for 30 minutes and 400° F. for 30 minutes.

Acoustic Testing of Mesh and Septum Core:

1. The above meshes provided by SEFAR America, Inc. can be adjusted by the supplier to provide a range of acoustic impedances from 25 to 120 cgs rayls.
2. The acoustic impedance range for the septum core can also be adjusted by the amount of adhesive placed on the mesh. Using an example of 50 cgs rayls mesh that is inserted into the honeycomb. If the adhesive dip level is 0.100 inch up the sides of the cap. The additional unsealed mesh above the adhesive line will reduce the final core impedance in the cell to a typical 42 cgs rayls. This would be the lowest impedance available with this design. If the adhesive seals up to the 0.1875 inch level—the typical impedance will be 70 cgs rayls.

Test Methods for Mesh and Core:

Two methods of testing can be used for acoustic evaluation. The Raylometer or an individual cell vacuum testing for air permeability. The Raylometer units are in cgs rayls and the individual cell vacuum units are in K Pascals. The following table sets forth the results of an acoustic evaluation of acoustic septum cap honeycombs where the caps were mesh only (no adhesive) and where the caps were bonded into place with adhesive, as described above.

|  | Raylometer Method | Vacuum Method |
| --- | --- | --- |
| 17-2005-W022 (Mesh Only) | 50 cgs rayls | 32 K Pascals |
| Septum Core (with adhesive) | 70 cgs rayls | 31 K Pascals |

The vacuum reading for the mesh only core was made using a 0.250 inch ID vacuum test head with the mesh sealed against the opening. The vacuum reading for the Septum Core was made inside one ⅜-inch septum cell. This is similar to a 0.396 inch ID test head. The vacuum head was calibrated as follows: Vacuum reading when open to the atmosphere 20 K Pa and when completely sealed to atmosphere 80 K Pa.

It should be noted that the acoustic impedance readings decrease as the area of mesh (more holes) increases. The typical resonator mesh has an open area of 2% to 4%. When sound waves pass through the acoustic mesh, the pressure of the waves causes the particles of the mesh to move. The sound impedance is the ratio of pressure and the particle velocity it produces in the mesh. In other words: The acoustic impedance is the pressure of the sound waves on the mesh divided by the instantaneous particle velocity of the mesh. As mentioned above, the unit of measure here for acoustic impedance is the cgs rayl. The actual cgs rayl units are in "Dyne-second per cubic meter $(dyn.s.cm^{-3})$". The acoustic resistance in the MKS rayl units is expressed in "Pascal-second per meter". 1 cgs rayl=10 MKS rayls. The acoustic impedance and vacuum pressure drop across the mesh material is a function of the open area (number and size of holes per unit area).

For example: when using Sefar mesh part number 17-2005-W022, the pressure drop for different sizes of circular mesh areas in septum cores (prepared as described above) were as follows:

| Mesh Diameter Inches | Mesh Area Sq-Inches | Vacuum Pressure Drop K- Pascals |
|---|---|---|
| .355 | .099 | 31 |
| .375 | .110 | 29 |
| .510 | .204 | 26 |
| .570 | .255 | 23 |

This table shows that the number of holes increases with mesh area—and the pressure drop across the larger septum mesh area is lower.

The Sefar mesh part number 17-2005-W022 used in the exemplary septum core, as described above, had a 0.355 inch diameter opening in the septum cap mesh, which gave vacuum readings of 31 K-Pascals and Rayl readings of 70 cgs rayls for this design.

When the vacuum drop is measured across the acoustic mesh in the ⅜ inch honeycomb cells the reading can range from 25 to 35 K-pascals and the acoustic impedance of the mesh in the ⅜ honeycomb cell will range from 50 cgs rayls to 120 cgs rayls.

As is apparent from the above example, the use of differing amounts of adhesive to bond the septum caps to the honeycomb provides one with the ability to increase or decrease the effective amount of area of mesh in the hexagon cell. This allows one to control the acoustic rayl value. For Example: If 60 cgs rayls mesh is used in the septum cap. The cell impedance can be lowered to 50 cgs rayls by allowing the mesh around the top sides of the cap to not be covered with adhesive. This approach generates more open area of mesh in the cell and will lower the effective acoustic impedance. If the adhesive is completely covering the sides and part of the radius between the vertical sides of the cap and the horizontal top of the septum cap the impedance will increase to 75 cgs rayls.

Having thus described exemplary embodiments of the present invention, it should be noted by those skilled in the art that the within disclosures are exemplary only and that various other alternatives, adaptations and modification may be made within the scope of the present invention. Accordingly, the present invention is not limited to the above preferred embodiments and examples, but is only limited by the following claims.

What is claimed is:

1. An acoustic structure that is adapted to be located near a source of noise, said structure comprising:
   a honeycomb comprising a first edge to be located nearest said source of noise and a second edge, said honeycomb further comprising a plurality of walls that extend between said first and second edges, said walls defining a plurality of cells wherein each of said cells has a cross-sectional area measured perpendicular to said walls and a depth defined by the distance between said first and second edges;
   a septum cap located within at least one of said cells, said septum cap comprising a sheet of acoustic material that has a thickness and a perimeter, said sheet of acoustic material being formed into a resonator portion that has an outer edge located at said walls and a flange portion that extends between said outer edge of said resonator portion and the perimeter of said sheet of acoustic material, said sheet of acoustic material comprising an open mesh fabric, said septum cap comprising an adhesive flow barrier located along said resonator portion, said adhesive flow barrier comprising open mesh fabric that has been flattened; and
   an adhesive that bonds said anchoring surface to said wall, said adhesive covering at least a portion of said anchoring surface.

2. An acoustic structure according to claim 1 wherein said woven fibers are monofilament polymer fibers.

3. An acoustic structure according to claim 1 wherein said sheet of acoustic material comprises one or more folding aids located around said perimeter.

4. An acoustic structure according to claim 1 at least two septum are located in said cell, said septum caps being located at different depths within said cell.

5. An acoustic structure according to claim 1 which comprises multiple septum caps that are located in multiple cells wherein the septum caps are located at substantially the same depth within said cells.

6. A power plant system comprising an acoustic structure according to claim 1 that is located near an engine.

7. An aircraft that comprises an acoustic structure according to claim 1.

8. A power plant system comprising an aircraft engine and a nacelle for said aircraft engine wherein said nacelle comprises an acoustic structure according to claim 1.

9. An acoustic structure according to claim 1 that additionally comprises a perforated skin attached to the first edge of said honeycomb and a solid skin attached to the second edge of said honeycomb.

10. A power plant system comprising an acoustic structure according to claim 9 that is located near an engine.

11. An aircraft that comprises an acoustic structure according to claim 9.

12. A power plant system comprising an aircraft engine and a nacelle for said aircraft engine wherein said nacelle comprises an acoustic structure according to claim 9.

13. A septum cap precursor comprising:
    a sheet of acoustic material that has a thickness and a perimeter, said sheet of acoustic material comprising a resonator portion that has an outer edge located and a flange portion that extends between said outer edge of said resonator portion and the perimeter of said sheet of acoustic material, said sheet of acoustic material comprising an open mesh fabric, said sheet of acoustic material comprising an adhesive flow barrier located along said outer edge of said resonator portion, said adhesive flow barrier comprising open mesh fabric that has been flattened.

14. A septum cap precursor according to claim 13 wherein said open mesh fabric comprises monofilament polymer fibers.

15. A septum cap precursor according to claim 13 wherein said sheet of acoustic material comprises one or more folding aids located around said perimeter.

16. A septum cap precursor according to claim 13 wherein the outer edge of said resonator portion is a hexagon.

17. A septum cap precursor according to claim 13 wherein said perimeter is an octagon.

18. A method for making an acoustic structure that is adapted to be located near a source of noise, said method comprising the steps of:

providing a honeycomb comprising a first edge to be located nearest said source of noise and a second edge, said honeycomb further comprising a plurality of walls that extend between said first and second edges, said walls defining a plurality of cells wherein each of said cells has a cross-sectional area measured perpendicular to said walls and a depth defined by the distance between said first and second edges;

providing at least one sheet of acoustic material that has a thickness and a perimeter, said sheet of acoustic material comprising an open mesh fabric, said sheet of acoustic material comprising an adhesive flow barrier, said adhesive flow barrier comprising open mesh fabric that has been flattened;

forming said sheet of acoustic material into a septum cap comprising a resonator portion that has an outer edge and a flange portion that extends between said outer edge of said resonator portion and the perimeter of said sheet of acoustic material wherein said adhesive flow barrier is located along said outer edge of said resonator portion; and inserting said septum cap into a cell of said honeycomb wherein said flange portion is in contact with said walls; and adhesively bonding said anchoring flange portion to said walls.

19. A method for making an acoustic structure according to claim 18 wherein said sheet of acoustic material comprises an open mesh fabric comprising woven monofilament fibers that have been flattened within said adhesive flow barrier.

20. A method for making an acoustic structure according to claim 18 wherein said sheet of acoustic material comprises one or more folding aids located around said perimeter.

* * * * *